P. L. KIMBALL.
FLEXIBLE BEARING.
APPLICATION FILED JUNE 6, 1917.
1,246,111.
Patented Nov. 13, 1917.
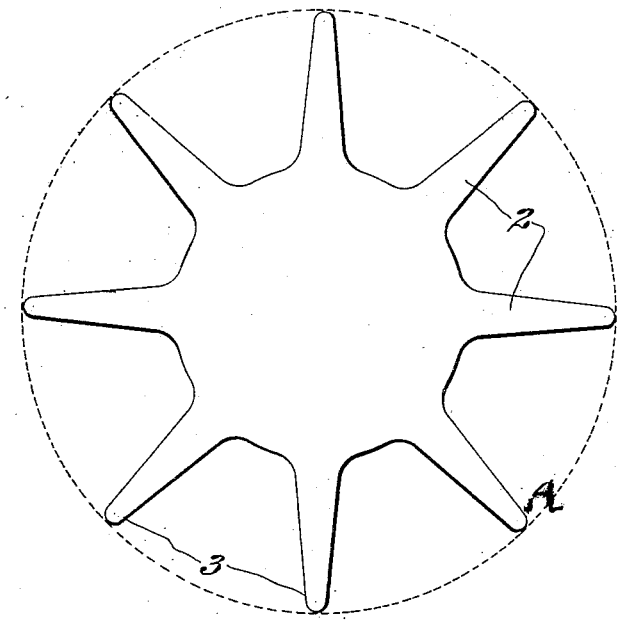
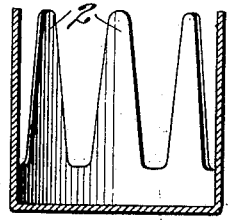
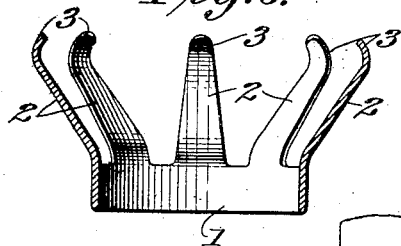
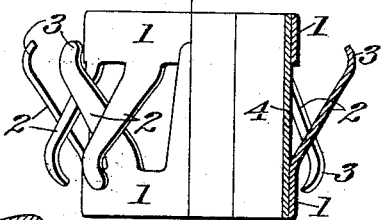
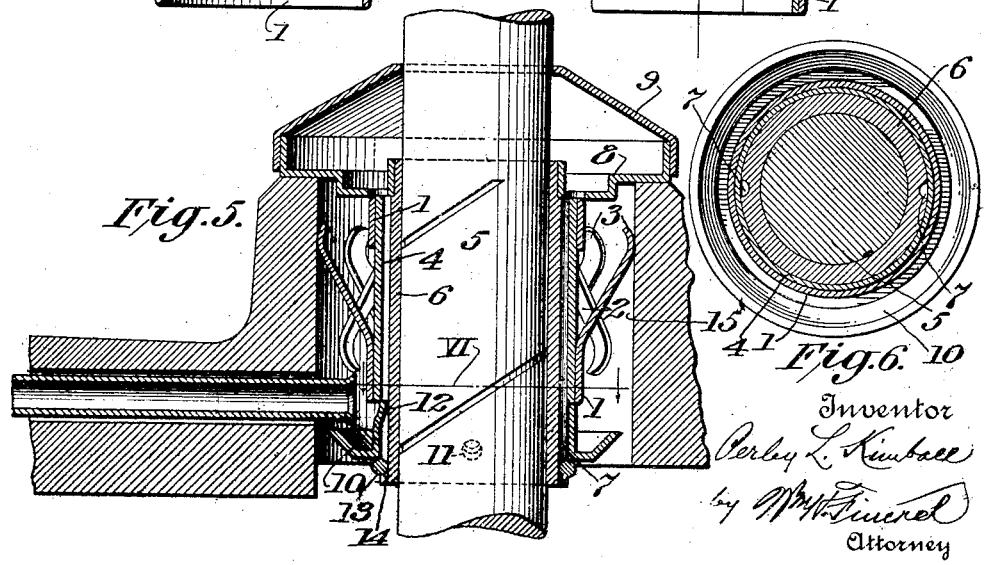
Inventor
Perley L. Kimball
by his Attorney

UNITED STATES PATENT OFFICE.

PERLEY L. KIMBALL, OF BELLOWS FALLS, VERMONT, ASSIGNOR TO THE VERMONT FARM MACHINE COMPANY, OF BELLOWS FALLS, VERMONT, A CORPORATION OF VERMONT.

FLEXIBLE BEARING.

1,246,111.  Specification of Letters Patent.  Patented Nov. 13, 1917.

Application filed June 6, 1917. Serial No. 173,129.

*To all whom it may concern:*

Be it known that I, PERLEY L. KIMBALL, a citizen of the United States, residing at Bellows Falls, in the county of Windham and State of Vermont, have invented a certain new and useful Improvement in Flexible Bearings, of which the following is a full, clear, and exact description.

This invention relates to that type of bearings for spindles or shafts, in which flexible or yielding means are provided in order to insure proper alinement of the spindle or shaft, such bearings being commonly used in connection with the spindles or shafts of centrifugal cream separators, but obviously capable of widely extended use in connection with the spindles or shafts of other machines.

Prior to my invention various forms of bowed or curved springs or spring fingers have been designed for use in such bearings.

The present invention includes the use of curved spring fingers of a novel form and arrangement, having in view economy of production, facility and security in assembling, and efficiency in operation, as I will proceed now to explain and finally claim.

In the accompanying drawings illustrating the invention, in the several figures of which like parts are similarly designated, Figure 1 is a plan view of the blank, the dotted lines indicating a circular piece of stock from which the blank may be cut. Fig. 2 is a cross-section of the blank cupped. Fig. 3 is a cross-section of the finished spring. Fig. 4 is a half section and elevation of the springs and their sleeve. Fig. 5 is a vertical cross-section of one form of assembly. Fig. 6 is a horizontal section on line VI of Fig. 5.

The springs may be blanked out of flat metal, in star form, substantially as indicated in Fig. 1, and then cupped, substantially as shown in Fig. 2, and then the bottom of the cupped blank is cut out so as to leave the annular unbroken, continuous rim 1 from which the active spring fingers 2 project, the rim and its fingers obviously being in one integral piece. These fingers are curved or bowed outwardly from the rim in the direction of their length, with their free ends 3 reversely curved. Two such springs are mounted invertedly upon the opposite ends of a split or other sleeve 4, with their fingers extending toward each other and the fingers of one spring alternating in the spaces between the fingers of the other spring, as shown in Fig. 4, so that there are series of upper and lower spring bearing surfaces distant from one another the length of the fingers. As thus arranged the fingers of opposite springs cross each other and in effect interlock. Each set of spring fingers, that is to say, all of the fingers extending from any one rim, are substantially alike. In order to secure the spring elements in the spaced-apart relation referred to, they may be fixedly and immovably applied to the sleeve by spot welding or otherwise attaching their rims 1 to the sleeve.

By this construction the springs may be fixed in relation to one another before introduction or incorporation of the spring element as a unitary whole in the bearing, and thus is obviated any and all liability of incorrect assembly and accidental displacement, and the necessity for the building up of the spring in the assembling of the bearing.

Illustrating one use of the invention, reference is made to Figs. 5 and 6, wherein the spring as shown is used in a yielding bearing for the spindle or shaft 5 of a centrifugal cream separator, which is surrounded by a bushing 6 on which is mounted the sleeve 4 carrying the springs. This bushing may have in its exterior longitudinal oil grooves 7 communicating with an oil cup 8 provided with a cap 9, the lower end of the bushing having applied to it an overflow cup 10. Ducts 11 extend from the overflow cup through the bushing. This overflow cup may be held in place against rotation on the bushing by depressing a portion of its rim, as at 12, Fig. 5, into one of the grooves, and the said cup and its superposed sleeve may be held in place longitudinally of the bushing as by an open spring ring 13 snapped into a circumferential groove 14 in the bushing. The spring fingers bear against the wall 15 of the surrounding frame of the machine in order to exert their flexibility or resilience in alining the bushing and shaft or spindle.

Oil or other lubricant may be supplied in any usual or approved way.

Variations in the details of construction and operation are permissible within the scope of the invention as herein claimed.

What I claim is:—

1. A flexible bearing, having a spring element composed of a sleeve and springs arranged at opposite ends thereof, each spring comprising an annular rim encircling the sleeve and fixed thereto and outwardly projecting longitudinally curved spring fingers, the fingers of one spring extending through the spaces of the opposite spring, and each spring having its fingers and rim in one integral piece.

2. A flexible bearing, having a spring element composed of a sleeve and springs arranged at opposite ends thereof, each spring comprising an annular rim encircling the sleeve and fixed thereto and outwardly projecting longitudinally curved spring fingers, one of the springs being inverted relatively to the other with its fingers extending through the spaces between the fingers of the other spring and crossing and interlocking with such other fingers.

3. A flexible bearing, having a spring element composed of a sleeve and springs arranged at opposite ends thereof, each spring comprising an annular rim encircling the sleeve and fixed thereto and outwardly projecting longitudinally curved spring fingers, the fingers of one spring extending through the spaces of the opposite spring, the ends of the spring fingers being reversely curved and extending opposite the rim of the companion spring.

In testimony whereof I have hereunto set my hand this fourth day of June A. D. 1917.

PERLEY L. KIMBALL.

Witnesses:
M. J. PIKE,
J. S. LANGWILL.